United States Patent
Zilly et al.

(10) Patent No.: US 10,511,787 B2
(45) Date of Patent: Dec. 17, 2019

(54) LIGHT-FIELD CAMERA

(71) Applicant: Fraunhofer-Gesellschaft zur Foerderung der angewandten Forschung e.V., Munich (DE)

(72) Inventors: Frederik Zilly, Stuttgart (DE); Joachim Keinert, Nuremberg (DE); Matthias Ziegler, Erlangen (DE); Michael Schoeberl, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 82 days.

(21) Appl. No.: 15/041,818

(22) Filed: Feb. 11, 2016

(65) Prior Publication Data
US 2016/0248987 A1 Aug. 25, 2016

(30) Foreign Application Priority Data
Feb. 12, 2015 (EP) .................................... 15154934

(51) Int. Cl.
*H04N 5/247* (2006.01)
*H04N 5/225* (2006.01)
(Continued)

(52) U.S. Cl.
CPC ............ *H04N 5/247* (2013.01); *G03B 35/10* (2013.01); *G06T 7/557* (2017.01); *H04N 5/2251* (2013.01);
(Continued)

(58) Field of Classification Search
CPC ............ G02B 27/0075; H04N 5/2254; H04N 5/23232; H04N 5/2258; H04N 13/243;
(Continued)

(56) References Cited

U.S. PATENT DOCUMENTS 6,538,691 B1 * 3/2003 Macy .................. H04N 3/2335
348/222.1
6,711,293 B1 3/2004 Lowe
(Continued)

FOREIGN PATENT DOCUMENTS

EP 2133726 A1 12/2009

OTHER PUBLICATIONS

"Stereo 3d Rigs", http://www.stereo-3d-info.de/stereo-rigs-und-professionelle-3drigs.html, Accessed Jan. 27, 2015, 2010, 1 page.
(Continued)

*Primary Examiner* — David E Harvey
(74) *Attorney, Agent, or Firm* — Perkins Coie LLP; Michael A. Glenn

(57) ABSTRACT

The invention provides a light-field camera for capturing multiple views of a scene, representing samples of a light-field, having: a primary camera configured for capturing a primary digital two-dimensional image of the scene; a two-dimensional camera array having a plurality of secondary cameras, each of the secondary cameras being configured for capturing a secondary digital two-dimensional image of the scene to produce at least one set of secondary digital two-dimensional images of the scene; a semitransparent mirror arranged such that an incident light beam originating from the scene is split up in a first partial light beam, directed to the primary camera, and a second partial light beam, directed to the camera array; and a processing unit configured for receiving the primary digital two-dimensional image and the at least one set of secondary digital two-dimensional images and configured for computing depth information for the primary digital two-dimensional image or a digital two-dimensional image corresponding to the primary digital two-dimensional image based on the set of secondary digital two-dimensional images.

23 Claims, 9 Drawing Sheets

(51) Int. Cl.
*H04N 5/235* (2006.01)
*G03B 35/10* (2006.01)
*G06T 7/557* (2017.01)
*H04N 13/243* (2018.01)
*G02B 27/00* (2006.01)
*G02B 27/14* (2006.01)

(52) U.S. Cl.
CPC ......... *H04N 5/2258* (2013.01); *H04N 5/2355* (2013.01); *H04N 5/2356* (2013.01); *H04N 13/243* (2018.05); *G02B 27/0075* (2013.01); *G02B 27/144* (2013.01); *G06T 2200/21* (2013.01); *G06T 2207/10024* (2013.01); *G06T 2207/10052* (2013.01)

(58) Field of Classification Search
CPC .... H04N 5/247; H04N 5/2251; H04N 5/2355; H04N 5/2356; G06T 7/557
See application file for complete search history.

(56) References Cited

U.S. PATENT DOCUMENTS

| | | | | |
|---|---|---|---|---|
| 7,948,515 | B1 | 5/2011 | Hines et al. | |
| 8,111,320 | B2* | 2/2012 | Drazic | G02B 27/0075 348/222.1 |
| 8,619,082 | B1* | 12/2013 | Ciurea | H04N 13/232 345/427 |
| 8,749,620 | B1* | 6/2014 | Knight | H04N 13/0011 348/49 |
| 2005/0265633 | A1* | 12/2005 | Piacentino | G06T 5/50 382/302 |
| 2006/0023078 | A1* | 2/2006 | Schmitt | H04N 5/32 348/222.1 |
| 2010/0265346 | A1* | 10/2010 | Iizuka | G06T 5/50 348/218.1 |
| 2011/0019184 | A1* | 1/2011 | Iwane | G02B 7/36 356/123 |
| 2013/0010073 | A1* | 1/2013 | Do | H04N 13/0214 348/46 |
| 2013/0021448 | A1 | 1/2013 | Fairburn et al. | |
| 2014/0049536 | A1 | 2/2014 | Neuman et al. | |
| 2014/0063332 | A1* | 3/2014 | Miyawaki | H04N 5/2254 348/360 |
| 2014/0098199 | A1 | 4/2014 | Yeatman, Jr. et al. | |
| 2014/0198187 | A1* | 7/2014 | Lukk | H04N 13/0239 348/49 |
| 2014/0198230 | A1* | 7/2014 | Tsutsumi | H04N 5/2258 348/218.1 |
| 2014/0253738 | A1* | 9/2014 | Mullis | H04N 17/002 348/187 |
| 2014/0334745 | A1* | 11/2014 | Fleischer | G06T 3/4061 382/284 |
| 2014/0375776 | A1* | 12/2014 | Abolbashari | G02B 27/005 348/49 |

OTHER PUBLICATIONS

Balogh, T. et al., "Real-Time 3D Light Field Transmission", Proc. SPIE, 772406, 2010, pp. 1-7.
Bay, Herbert et al., "SURF: Speeded Up Robust Features", Proceedings of the 9th European Conference on Computer Vision, Springer Verlag, 2006, 14 pages.
Bishop, T.E. et al., "The Light Field Camera: Extended Depth of Field, Aliasing, and Superresolution", IEEE Transactions on Pattern Analysis and Machine Intelligence, vol. 34, No. 5, May 2012, pp. 972-986.
Derobe, Alain, "3D Stereo Rig-User Manual", XP055204575, Retrieved from the Internet: URL:http://www.dtic.mil/docs/citations/ADO 735722 (retrieved on Jul. 24, 2015), Nov. 6, 2014, pp. 5, 15, 17.
Fehn, C.A., "3D-TV Approach Using Depth-Image-Based Renering (DIBR)", VIIP, 2003, 6 pages.
Fraunhofer, HHI, "First Trifocal 3D film at NAB Show", http://www.hhi.fraunhofer.de/fieldsof-competence/image-processing/news/news-article/article/first-trifocal-3d-film-at-nabshow.html, retrieved Aug. 9, 2016, 2016, 3 pages.
Georgiev, T. et al., "Lytro Camera Technology: Theory, Algorithms, Performance Analysis", In Proc. SPIE 8667, Multimedia Content and Mobile Devices, Sep. 2013, 10 pages.
Gortler, S.J. et al., "The Lumigraph", Proc. ACM Siggraph, ACM Press, 1996, pp. 43-54.
Keinert, J. et al., "Cost-Effective Multi-Camera Array for High Quality Video With Very High Dynamic Range", Proceedings of SPIE vol. 9023, Digital Photography X, 90230Y, 2014, 15 pages.
Levoy, M. et al., "Light Field Rendering", Proc. ACM Siggraph ACM Press, Jul. 1996, pp. 31-42.
Lytro, "Lytro Illum Camera", Retrieved Aug. 9, 2016, 6 pages.
Marton, F. et al., "A Real-Time Coarse-to-Fine Multiview Capture System for All-in-Focus Rendering on a Light-Field Display", 3DTV-CON,, 2011, pp. 1-4.
Seitz, S. et al., "A Comparison and Evaluation of Multi-View Stereo Reconstruction Algorithms", Proc. CVPR, 1, 2006, pp. 519-828.
Shapira, D. et al., "Multiple Histogram Matching", In Proceedings of the IEEE International Conference on Image Processing, 2013, 3 pages.
Tauber, Z. et al., "Review and Preview: Disocclusion by Inpainting for Image-Based Rendering", IEEE Transactions on Systems Man and Cybernetics Part C Applications and Reviews 37 (4), Jul. 2007, p. 527-540.
Van Baar, Jeroen, "Multi-Sensor FusionCam", http://www.disneyresearch.com/project/multi-sensor-fusioncam/ /accessed Jan. 27, 2015, 2012, 1 page.
Wilburn, B. et al., "M. High Performance Imaging Using Large Camera Arrays", ACM Trans. Graph. (Proc. Siggraph), Retrieved from the Internet: URL:http://portal.acm.org/citation.cfm?id=1073259, p. 1; figures a, b and c, Section 4.1; p. 4, Jul. 1, 2005, pp. 4, 24, 765-776.
Ziegler, Matthias et al., "Multi-Camera System for Depth Based Visual Effects and Compositing", Proceeding CVMP 2015, Proceedings of the 12th European Conference on Visual Media Production, Article No. 3, ACM New York, NY, Nov. 2015, 10 pages.
Zilly, F. et al., "Generation of Multi-View Video Plus Depth Content Using Mixed Narrow and Wide Baseline Setup", 3DTV-Conference: The True Vision Capture, Transmission and Display of 3D Video (3DTV-CON), doi: 10.1109/3DTV.2012.6365483, 2012, 4 pages.
Zilly, F., "Multi-Camera Rectification Using Linearized Trifocal Tensor Proc", 21st International Conference on Pattern Recognition (ICPR), Nov. 2012, 5 pages.
Zilly, Frederik et al., "Computational Imaging for Stop-Motion Animated Video Productions", Proceedings IBC 2014 Conference, Sep. 11-15, 2014. Amsterdam, Sep. 11, 2014, Sep. 2014, p. 4.
Zilly, Frederik et al., "Concepts for Enhanced Creativity in Post-Production", Lightfield Media Production Systems, Apr. 2015, 55 pages.
Zilly, Frederik et al., "Lightfield Media Production System Using Sparse Angular Sampling", Proceedings, Siggraph '13 ACM Siggraph 2013 Posters, 2013, 1 page.
Zilly, Frederik, "Multi Camera Content Creation—New Technologies for Generation 3D", Fraunhofer HHI, http://www.hhi.fraunhofer.de/fields-of-competence/imageprocessing/solutions/capture/multi-camera-content-creation.html, accessed Jan. 27, 2015, 2011, 2 pages.

* cited by examiner

LIGHT-FIELD CAMERA

CROSS-REFERENCE TO RELATED APPLICATION

This application claims priority from European Application No. 15154934.2, filed Feb. 12, 2015, which is incorporated herein by reference in its entirety.

BACKGROUND OF THE INVENTION

Light-field image and video processing offers a much richer variety of image manipulation possibilities compared to traditional 2D images. However, capturing of high-quality light-fields is still unsolved, because a huge number of different views need to be combined with excellent image quality such as dynamic range, color fidelity and resolution.

Traditional 2D-images represent the projection of the three-dimensional world onto a two-dimensional plane. In digital images, this plane is rasterized into a grid of so called pixels. For every visible point in space, a 2D-image records the intensity of one or multiple pixels.

Stereoscopic images extend this principle by recording two different views of a scene. By showing the left captured image to the left eye and the right captured image to the right eye, a depth impression can be provided to the user. While this in theory significantly increases the visual experience, literature reports various short comings such as convergence conflicts, difficulties to adapt the content to varying screen sizes and many more Mathematically, a light-field can be described by a five dimensional function $L_{\lambda,t}(x, y, z, \theta, \phi)$ assigning to every point in space and to every direction a corresponding radiance. The parameters and t define the wavelength (color information) and time. Light-field imaging exceeds the previous mentioned technologies by capturing a much larger number of viewing positions of a scene. These views are typically arranged along a surface such as a plane (so called 4D light field [4] or Lumigraph [5]). Then these views do not only have different horizontal positions as for stereoscopic images, but also in vertical direction. Ideally, the individual views are spaced arbitrarily dense, such that it is possible to capture all rays from the scene traversing the chosen surface.

This huge amount of information permits much richer editing and manipulation possibilities of the captured images compared to traditional 2D technology. This includes among others the change of focal points and depths, the creation of virtual viewing positions, depth based compositing and special effects like dolly zoom [6]. A possible processing chain is described in [7].

However, the capture of the light-field such that it has sufficient quality remains an unsolved problem which will be addressed in the following invention.

There are two fundamental techniques to capture a light-field. On the one hand, there exist a variety of plenoptic cameras [8, 9, 10]. Compared to traditional cameras, they introduce an additional array of so called micro lenses between the main lens and the sensor. By these means, it is indeed possible to capture different viewing positions. However, they still remain rather similar. Moreover, because of the small size of the micro lenses, high quality imaging reaching digital cinema quality is still not solved.

On the other hand, light-fields can be acquired by means of multi-camera arrays [11, 12, 13]. Given that many different views are necessitated in order to avoid artifacts when performing image manipulations, the extensions of the cameras need to be rather small. Moreover, typically cameras with reduced costs are used in order to make the overall system affordable.

However, because of limited size and costs, the image quality provided by these cameras cannot reach the highest quality level that is technologically possible today. For instance, the quality of color reproduction, dynamic range and signal to noise ratio is much worse for small sized and cheap cameras compared to professional devices used in digital cinema movie productions. Given that these cinema cameras are large and expensive, their combination to large multi-camera arrays for light field acquisition is prohibitive. As a consequence, applications with highest quality requirements cannot be served by the light-field technology, although the resulting editing possibilities would be highly welcome. The same drawback holds for all applications where due to cost reasons a single 2D camera cannot be replaced by a multitude of them in order to capture a light-field.

SUMMARY

According to an embodiment, a light-field camera for capturing multiple views of a scene, the multiple views representing samples of a light-field, may have: a primary camera configured for capturing a primary digital two-dimensional image of the scene; a two-dimensional camera array having a plurality of secondary cameras, wherein each of the secondary cameras is configured for capturing a secondary digital two-dimensional image of the scene in order to produce at least one set of secondary digital two-dimensional images of the scene; a semitransparent mirror arranged in such way that an incident light beam originating from the scene is split up in a first partial light beam, which is directed to the primary camera, and a second partial light beam, which is directed to the camera array; and a processing unit configured for receiving the primary digital two-dimensional image and the at least one set of secondary digital two-dimensional images and configured for computing a depth information for the primary digital two-dimensional image or a digital two-dimensional image corresponding to the primary digital two-dimensional image based on the set of secondary digital two-dimensional images.

According to another embodiment, a method for capturing multiple views of a scene, the multiple views representing samples of a light-field, may have the steps of: capturing a primary digital two-dimensional image of the scene using a primary camera; producing at least one set of secondary digital two-dimensional images of the scene using a two-dimensional camera array having a plurality of secondary cameras, wherein each of the secondary cameras is configured for capturing a secondary digital two-dimensional image of the scene; providing a semitransparent mirror arranged in such way that an incident light beam originating from the scene is split up in a first partial light beam, which is directed to the primary camera, and a second partial light beam, which is directed to the camera array; and receiving the primary digital two-dimensional image and the at least one set of secondary digital two-dimensional images and computing depth information for the primary digital two-dimensional image or a digital two-dimensional image corresponding to the primary digital two-dimensional image based on the set of secondary digital two-dimensional images using a processing unit.

Another embodiment may have a computer program for performing, when running on a computer or a processor, the above method.

A light-field camera for capturing multiple views of a scene is provided, the multiple views representing samples of a light-field, wherein the light-field camera comprises:

a primary camera configured for capturing a primary digital two-dimensional image of the scene;

a two-dimensional camera array comprising a plurality of secondary cameras, wherein each of the secondary cameras is configured for capturing a secondary digital two-dimensional image of the scene in order to produce at least one set of secondary digital two-dimensional images of the scene;

a semitransparent mirror arranged in such way that an incident light beam originating from the scene is split up in a first partial light beam, which is directed to the primary camera, and a second partial light beam, which is directed to the camera array; and a processing unit configured for receiving the primary digital two-dimensional image and the at least one set of secondary digital two-dimensional images and configured for computing a depth information for the primary digital two-dimensional image or a digital two-dimensional image corresponding to the primary digital two-dimensional image based on the set of secondary digital two-dimensional images.

The depth information may have the form of a disparity map or of depth map.

The primary camera may comprise a primary optical objective and a primary photodetector array, wherein the primary optical objective is configured for producing a real image of the scene on the primary photodetector array.

Each secondary camera of the plurality of secondary cameras may comprise a secondary optical objective and a secondary photodetector array, wherein the secondary optical objective is configured for producing a real image of the scene on the secondary photodetector array.

The invention allows to lower costs of a light-field camera at a given quality or, in other words, to improve the quality of a light field camera at given costs. The quality of the digital two-dimensional output image corresponds mainly to the quality of the primary camera. Furthermore, the depth information is generated on the basis of data gathered from the plurality of the secondary cameras, wherein the quality of the secondary cameras is less important for the quality of the digital two-dimensional output image and for producing the depth information. For these reasons the invention allows the use of secondary cameras, which have a significant lower quality than the primary camera so that the ratio of quality and costs may be improved.

The use of a semitransparent mirror gives the opportunity to use a camera array which comprises the secondary cameras. Such camera arrays can be much cheaper than a plurality of individual secondary cameras so that the quality to cost ratio may be further improved. By the semitransparent mirror it may be ensured that the angle of vision or perspective of the primary camera and the angle of vision of the secondary cameras are basically the same even if the primary camera and the camera array are spaced apart from each other, which is insofar important as high-quality cameras usually are quite spacious. Furthermore, it has to be noted that a common angle of view of the primary camera and the secondary cameras facilitates the processing of the captured images, which again leads to a better quality to cost ratio.

A digital two-dimensional image corresponding to the primary digital two-dimensional image is an image produced by applying a digital image editing process, such as image size alteration, cropping, noise reduction, color adaptation, correction of lens distortions, rectifying, sharpening, softening, contrast change, brightening, darkening, gamma correction and so on, to the primary digital two-dimensional image.

According to an embodiment of the invention the primary camera fulfills at least one of the following conditions: having a higher resolution than the secondary cameras, having a better quality of color reproduction than the secondary cameras, having a wider dynamic range than the secondary cameras, having a larger signal-to-noise ratio than the secondary cameras, having higher bit depth than the secondary cameras.

According to an embodiment of the invention a primary objective of the primary camera has fewer distortions than secondary objectives of the secondary cameras. By these features the ratio of quality and costs may be further improved.

According to an embodiment of the invention the processing unit is configured for computing the depth information for the digital two-dimensional output image corresponding to the primary digital two-dimensional image solely based on the set of secondary digital two-dimensional images and on the position of the primary camera relative to the secondary cameras. As in this embodiment the depth information is solely computed from the set of secondary digital two-dimensional images and on the position of the primary camera relative to the secondary cameras, problems caused by the different quality of the primary digital two-dimensional image and the secondary digital two-dimensional images may be avoided.

According to an embodiment of the invention the secondary cameras have substantially parallel optical axes. These features lead to less complex computation algorithms for retrieving the depth information.

According to an embodiment of the invention the secondary cameras have the same optical and/or electrical properties. Examples for such optical properties are the resolution, the quality of color reproduction, the dynamic range, signal-to-noise ratio, the lens distortions of the secondary optical objectives and the bit depth. Examples for such electrical properties are the energy supply voltage, the energy consumption, the output voltage and the electronic signal processing chain. These features lead to less complex computation algorithms for retrieving the depth information.

According to an embodiment of the invention the secondary cameras are arranged in a lattice-like manner. The term "lattice-like" refers to a regular spacing or arrangement of the secondary cameras. These features lead to less complex computation algorithms for retrieving the depth information.

According to an embodiment of the invention and the primary camera, the camera array and the semitransparent mirror are mounted to a rig. The use of rig facilitates a proper adjustment of the position of the components.

According to an embodiment of the invention the rig comprises mechanical adjusting means for adjusting a crossing point of an optical axis of the primary camera and the optical axis of one of the secondary cameras.

According to an embodiment of the invention the rig comprises mechanical adjusting means for compensating a difference of an optical path length from the scene to the primary camera and an optical path length from the scene to the camera array.

According to an embodiment of the invention the rig comprises mechanical adjusting means for adjusting an angular orientation of the primary camera with respect to a rotation about a first rotation axis parallel to an optical axis of the primary camera relative to an angular orientation of the camera array with respect to a rotation about an rotation axis parallel to the optical axes of the secondary cameras.

According to an embodiment of the invention the rig comprises mechanical adjusting means for compensating a difference of an angle from the first partial light beam to the optical axis of the primary camera and an angle from the second partial light beam to the optical axes of one of the secondary cameras.

Above mentioned mechanical adjusting means allow a highly precise adjustment of the components of the light-field camera which minimizes the computational efforts for producing the two-dimensional output image and the corresponding depth information.

According to an embodiment of the invention the secondary cameras are configured for capturing a plurality of sets of secondary digital two-dimensional images while the primary camera captures one primary digital two-dimensional image, wherein each set of secondary digital two-dimensional images has different exposure settings than the other sets of secondary digital two-dimensional images, and wherein the processing unit is configured for computing the depth information based on the plurality of sets of secondary digital two-dimensional images. Examples for the exposure settings are the exposure time, focal length, aperture and optical filters, such as neutral density filters.

By these features it can be ensured that all objects visible in the primary camera, which are neither over- nor under-exposed, are also visible in at least one of the individual captures of every secondary camera with sufficient precision.

According to another embodiment of the invention the secondary cameras are combined into groups, wherein each group is configured to produce a subset of the set of secondary digital two-dimensional images of the scene, wherein each secondary camera has the same exposure settings as the other secondary cameras of the same group but different exposure settings than the secondary cameras of the other groups.

By these features it can be ensured that all objects visible in the primary camera, which are neither over- nor under-exposed, are also visible in the captures of at least one of the groups of the secondary cameras.

According to an embodiment of the invention the processing unit comprises a rectification module configured for simultaneously rectifying of the secondary digital two-dimensional images of the set of secondary digital two-dimensional images and the primary digital two-dimensional image by using feature points or checkerboards in order to produce a set of rectified secondary digital two-dimensional images and a rectified primary digital two-dimensional image.

According to an embodiment of the invention the processing unit comprises a depth information computing module configured for computing depth information for each of the secondary cameras based on the set of rectified secondary digital two-dimensional images.

According to an embodiment of the invention the processing unit comprises a depth warping module configured for warping each of the depth information to a position of the rectified primary digital two-dimensional image in order to produce the depth information for the primary digital two-dimensional image or the digital two-dimensional image corresponding to the primary digital two-dimensional image.

By this means data of the primary camera and the camera array can be combined to a high quality light field.

According to an embodiment of the invention the processing unit comprises a rectification module configured for rectifying of the secondary digital two-dimensional images of the set of secondary digital two-dimensional images by using feature points or checkerboards in order to produce a set of rectified secondary digital two-dimensional images.

According to an embodiment of the invention the processing unit comprises a depth information computing module configured for computing depth information for each of the secondary cameras based on the set of rectified secondary digital two-dimensional images.

According to an embodiment of the invention the processing unit comprises a depth warping module configured for warping each of the depth information to a position of the primary digital two-dimensional image in order to produce the depth information for the primary digital two-dimensional image or the digital two-dimensional image corresponding to the primary digital two-dimensional image.

By this means data of the primary camera and the camera array can be combined to a high quality light field.

According to an embodiment of the invention the processing unit comprises a depth information computing module configured for computing a depth information for each of the secondary cameras and a depth information for the primary camera based on the set of rectified secondary digital two-dimensional images and the rectified primary image.

According to an embodiment of the invention the light-field camera comprises a post-processing unit comprising a primary image warping module configured for warping the rectified primary digital two-dimensional image to a warped rectified primary digital two-dimensional image corresponding to a virtual camera position of the primary camera by using the depth information.

According to an embodiment of the invention the post-processing unit comprises a secondary image warping module configured for warping each of the rectified secondary digital two-dimensional images into warped rectified secondary two-dimensional digital images corresponding to a position of the warped rectified primary two-dimensional image.

According to an embodiment of the invention the post-processing unit comprises a disocclusion filling module configured for filling of disocclusions in the warped rectified primary digital two-dimensional image WRPDI with information gathered from the warped rectified secondary digital two-dimensional images in order to produce an enhanced digital two-dimensional output image.

A method for capturing multiple views of a scene is provided, the multiple views representing samples of a light field, the method comprising the steps: capturing a primary digital two-dimensional image of the scene using a primary camera;

producing at least one set of secondary digital two-dimensional images of the scene using a two-dimensional camera array comprising a plurality of secondary cameras, wherein each of the secondary cameras is configured for capturing a secondary digital two-dimensional image of the scene;

providing a semitransparent mirror arranged in such way that an incident light beam originating from the scene is split up in a first partial light beam, which is directed to the primary camera, and a second partial light beam, which is directed to the camera array; and receiving the primary digital two-dimensional image and the at least one set of secondary digital two-dimensional images and computing depth information for the primary digital two-dimensional image or a digital two-dimensional image corresponding to the primary digital two-dimensional image based on the set of secondary digital two-dimensional images using a processing unit.

Moreover, a computer program for performing, when running on a computer or a processor, the inventive method is provided.

BRIEF DESCRIPTION OF THE DRAWINGS

Embodiments of the invention are subsequently discussed with respect to the accompanying drawings, in which.

DETAILED DESCRIPTION OF THE INVENTION

With respect to the devices and the methods of the described embodiments the following shall be mentioned:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 1:
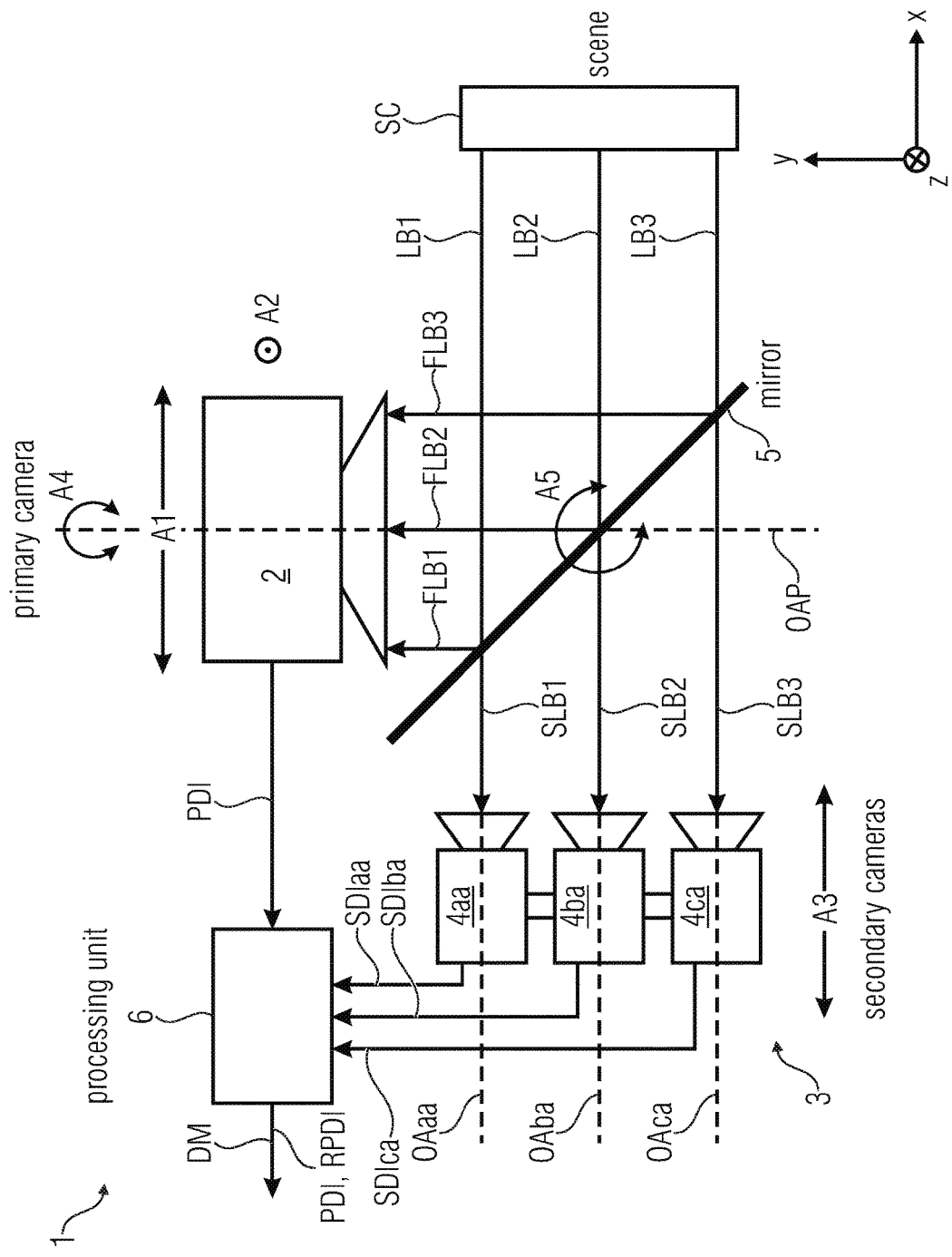
FIG. 1 illustrates a first embodiment of a light-field camera according to the invention in a schematic view.

FIG. 1 illustrates a first embodiment of a light-field camera 1 according to the invention in a schematic view.

The light-field camera for capturing multiple views of a scene SC, the multiple views representing samples of a light-field, the light-field camera 1 comprising:

a primary camera 2 configured for capturing a primary digital two-dimensional image PDI of the scene SC;

a two-dimensional camera array 3 comprising a plurality of secondary cameras 4aa . . . 4ce, wherein each of the secondary cameras 4aa . . . 4ce is configured for capturing a secondary digital two-dimensional image SDIaa . . . SDIce of the scene SCI in order to produce at least one set of secondary digital two-dimensional images SDIaa . . . SDIce of the scene;

a semitransparent mirror 5 arranged in such way that an incident light beam LB1, LB2, LB3 originating from the scene SC is split up in a first partial light beam FLB1, FLB2, FLB3, which is directed to the primary camera 2, and a second partial light beam SLB1, SLB2, SLB3, which is directed to the camera array 3; and a processing unit 6 configured for receiving the primary digital two-dimensional image PDI and the at least one set of secondary digital two-dimensional images SDIaa . . . SDIce and configured for computing depth information DM for the primary digital two-dimensional image PDI or a digital two-dimensional image RPDI corresponding to the primary digital two-dimensional image PDI based on the set of secondary digital two-dimensional images SDIaa . . . SDIce.

In the example of FIG. 1 the secondary cameras 4aa . . . 4ce are arranged in a two-dimensional grid 3 and observe the scene SC through a semi-transparent mirror 5. Often, a transparency of 50% is used, although not strictly necessary. The optical axis OAP of the primary camera 2 is rotated about 90° relative to the optical axes OAaa, OAba, OAca of the camera array 3 and observes the reflected image. However, it is also possible to interchange the positions of the primary camera 2 and the camera array 3.

According to an embodiment of the invention the primary camera 2 fulfills at least one of the following conditions: having a higher resolution than the secondary cameras 4aa . . . 4ce, having a better quality of color reproduction than the secondary cameras 4aa . . . 4ce, having a wider dynamic range than the secondary cameras 4aa . . . 4ce, having a larger signal-to-noise ratio than the secondary cameras 4aa . . . 4ce, having higher bit depth than the secondary cameras 4aa . . . 4ce.

According to an embodiment of the invention a primary objective of the primary camera 2 has fewer distortions than secondary objectives of the secondary cameras 4aa . . . 4ce. By these features the ratio of quality and costs may be further improved.

According to an embodiment of the invention the processing unit 6 is configured for computing the depth information DM for the digital two-dimensional output image OI corresponding to the primary digital two-dimensional image PDI solely based on the set of secondary digital two-dimensional images SDIaa . . . SDIce and on the position of the primary camera 2 relative to the secondary cameras 4aa . . . 4ce. Before computation of the depth information, images may be stored on a storage unit.

According to an embodiment of the invention the secondary cameras 4aa . . . 4ce have substantially parallel optical axes OAaa, OAba, OAca.

According to an embodiment of the invention the primary camera 2, the camera array 3 and the semitransparent mirror 5 are mounted to a rig.

According to an embodiment of the invention the rig comprises mechanical adjusting means for adjusting a crossing point of an optical axis OAP of the primary camera 2 and the optical axis OAba of one of the secondary cameras 4aa . . . 4ce. In the embodiment of FIG. 1 adjusting means allow to move the primary camera 2 in x-direction as illustrated by arrow A1 and in z-direction as illustrated by arrow A2. By such adjusting means the crossing points of the optical axis OAP of the primary camera 2 and the optical axes OAaa, OAba, OAca of the secondary cameras 4aa . . . 4ce may be adjusted.

According to an embodiment of the invention the rig comprises mechanical adjusting means for compensating a difference of an optical path length from the scene SC to the primary camera 2 and an optical path length from the scene SC to the camera array 3. In the embodiment of FIG. 1 the optical path length from the scene SCI to the camera array 3 may be adjusted by moving the camera array 3 in the x-direction as illustrated by arrow A3.

According to an embodiment of the invention the rig comprises mechanical adjusting means for adjusting an angular orientation of the primary camera 2 with respect to a rotation about a first rotation axis parallel to an optical axis OAP of the primary camera 2 relative to an angular orientation of the camera array 3 with respect to a rotation about an rotation axis parallel to one of the optical axes OAaa, OAba, OAca of the secondary cameras 4aa . . . 4ce. In the embodiment of FIG. 1 the primary camera 2 may be rotated around the optical axis OAP as illustrated by arrow A4 in order to adjust the angular orientation of the primary camera 2 this respect to an angular orientation of the camera array 3. In other embodiments the primary camera is fixed and the camera array A3 is rotatable relative to one of the optical axis OAaa, OAba, OAca of the secondary cameras 4aa . . . 4ce.

According to an embodiment of the invention the rig comprises mechanical adjusting means for compensating a difference of an angle from the optical axis OAP of the primary camera 2 to the first partial light beam FLB1, FLB2, FLB3 and an angle from the second partial light beam SLB1, SLB2, SLB3 to the optical axes OAaa, OAba, OAca of one of the secondary cameras 4aa . . . 4ce. In the embodiment of FIG. 1 such compensation may be done by rotating the semitransparent mirror as illustrated by arrow A5. Alternatively, primary camera 2 or camera array 3 may be rotated accordingly.

According to an embodiment of the invention the secondary cameras 4aa . . . 4ce are configured for capturing a plurality of sets of secondary digital two-dimensional images SDIaa . . . SDIce while the primary camera 2 captures one primary digital two-dimensional image PDI, wherein each set of secondary digital two-dimensional images SDIaa . . . SDIce has different exposure settings than the other sets of secondary digital two-dimensional images SDIaa . . . SDIce, and wherein the processing 6 unit is configured for computing the depth information DM based on the plurality of sets of secondary digital two-dimensional images SDIaa . . . SDIce.

Because of the high quality of the primary camera 2, its dynamic range might be much larger than the secondary cameras SDIaa . . . SDIce. This may cause that objects SC visible in the primary camera 2 might be over- or underexposed in the secondary cameras SDIaa . . . SDIce, preventing proper light-field capturing. In this case, one strategy consists to use temporal bracketing for the secondary cameras SDIaa . . . SDIce. In other words, while the primary camera 2 captures one exposure, the secondary cameras SDIaa . . . SDIce capture two or more images, each with different exposure settings. These individual images might be fused to an overall image with higher dynamic range [16], although not being strictly necessary. By these means it can be ensured that all objects visible in the primary camera 2, which are neither over- nor underexposed, are also visible in at least one of the individual exposure brackets of every secondary camera SDIaa . . . SDIce.

Furthermore, the invention provides a method for capturing multiple views of a scene SC, the multiple views representing samples of a light-field, the method comprising the steps:

capturing a primary digital two-dimensional image PDI of the scene SC using a primary camera 2;

producing at least one set of secondary digital two-dimensional images SDIaa . . . SDIce of the scene SC using a two-dimensional camera array 3 comprising a plurality of secondary cameras 4aa . . . 4ce, wherein each of the secondary cameras 4aa . . . 4ce is configured for capturing a secondary digital two-dimensional image SDIaa . . . SDIce of the scene SC;

providing a semitransparent mirror 5 arranged in such way that an incident light beam LB1, LB2, LB3 originating from the scene SC is split up in a first partial light beam FLB1, FLB2, FLB3, which is directed to the primary camera 2, and a second partial light beam SLB1, SLB2, SLB3, which is directed to the camera array 3; and receiving the primary digital two-dimensional image PDI and the at least one set of secondary digital two-dimensional images SDIaa . . . SDIce and computing depth information DM for the primary digital two-dimensional image PDI or a digital two-dimensional output image RPDI corresponding to the primary digital two-dimensional image PDI based on the set of secondary digital two-dimensional images SDIaa . . . SDIce using a processing unit 6.

In another aspect the invention provides a computer program for performing, when running on a computer or a processor, the method according to the invention.

Figure 2:
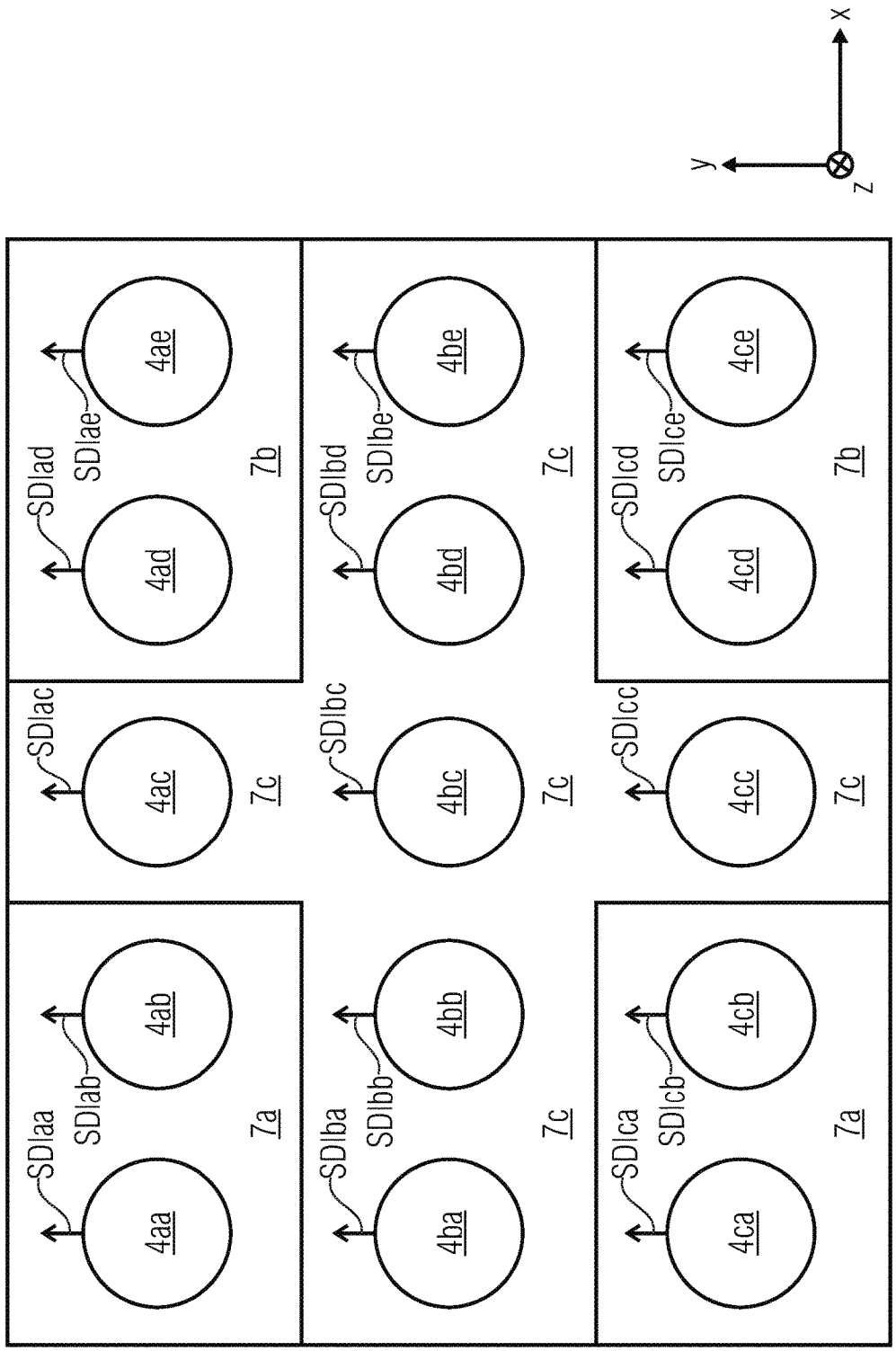
FIG. 2 illustrates an embodiment of a two-dimensional camera array in a schematic view.

FIG. 2 illustrates an embodiment of a two-dimensional camera array 3 in a schematic view.

According to an embodiment of the invention the secondary cameras 4aa . . . 4ce have the same optical and/or electrical properties.

According to an embodiment of the invention the secondary cameras 4aa . . . 4ce are arranged in a lattice-like manner.

According to an embodiment of the invention the secondary cameras 4aa . . . 4ce are combined into groups 7a, 7b, 7c, wherein each group 7a, 7b, 7c is configured to produce a subset of the set of secondary digital two-dimensional images SDIaa . . . SDIce of the scene SC, wherein each secondary camera SDIaa . . . SDIce has the same exposure settings as the other secondary cameras SDIaa . . . SDIce of the same group 7a, 7b, 7c but different exposure settings than the secondary cameras SDIaa . . . SDIce of the other groups 7a, 7b, 7c.

Within the example from FIG. 2, three different groups 7a, 7b, 7c are used, but a different number of groups is also possible. All secondary cameras SDIaa . . . SDIce belonging to one group 7a, 7b, 7c use the same capture settings such as exposure time, focal length, aperture and neutral density filter. Usage of the latter permits to adjust the sensitivity of the secondary cameras SDIaa . . . SDIce, while neither changing exposure time nor aperture. Combination of multiple images with different neutral density filters permits to capture an image of higher dynamic range [16] while achieving the same appearance of moving objects than in the primary camera 2. Usage of different focal lengths in the different groups 7a, 7b, 7c permits to better compensate for focal length changes in the primary camera 2. Moreover, by offsetting the exposure instances of the different groups 7a, 7b, 7c, the frame rate of the standard cameras can be increased.

It has to be noted that the assignment of the cameras to the individual groups in FIG. 2 is only an example. Other assignments are obviously possible as well.

Figure 3:
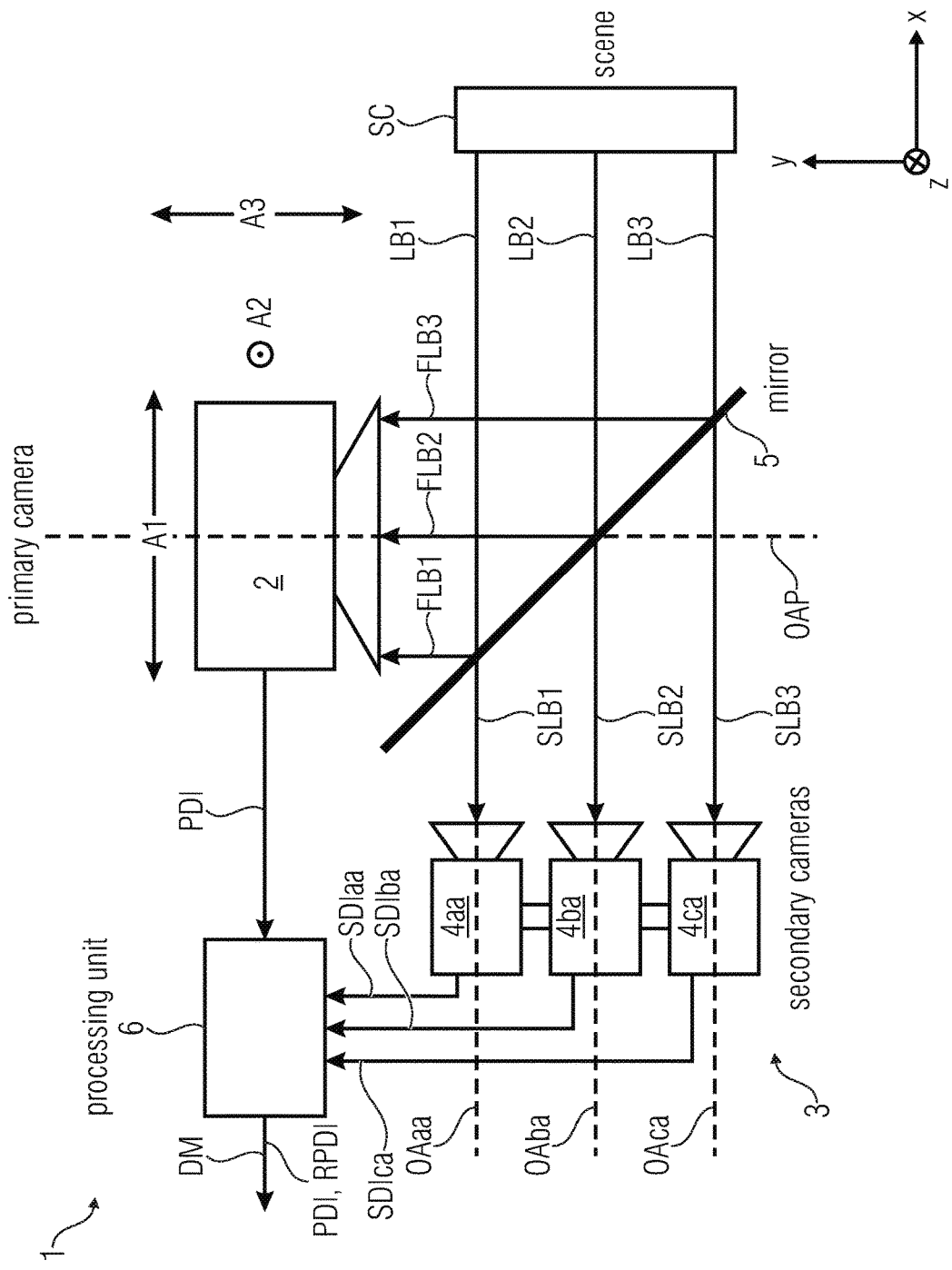
FIG. 3 illustrates a second embodiment of a light-field camera according to the invention in a schematic view.

FIG. 3 illustrates a second embodiment of a light-field camera 1 according to the invention in a schematic view.

In the embodiment shown in FIG. 3, the camera array 3 has a fixed position, while the primary camera 2 can be moved in x-, y- and z-direction. In another embodiment, the primary camera 2 is fixed and the camera array 3 can be moved in x-, y- and z-direction. In another embodiment, the camera array 3 can be moved in x- and y-direction, while the primary camera 2 can be moved in y-direction.

In all these configurations, the mirror 5 can be optionally removed such that the camera array has a direct view on the scene without any reflections or loss of light by the mirror.

In another embodiment, the locations of the array 3 and primary camera 2 are interchanged.

In again another embodiment, some of the mechanical adjustment possibilities are eliminated in order to simplify the construction of the rig. For instance, in FIG. 3 the position of the primary camera 2 might be fixed, the position of the array might be fixed, or both the array and the primary camera 2 might have fixed positions.

Figure 4:
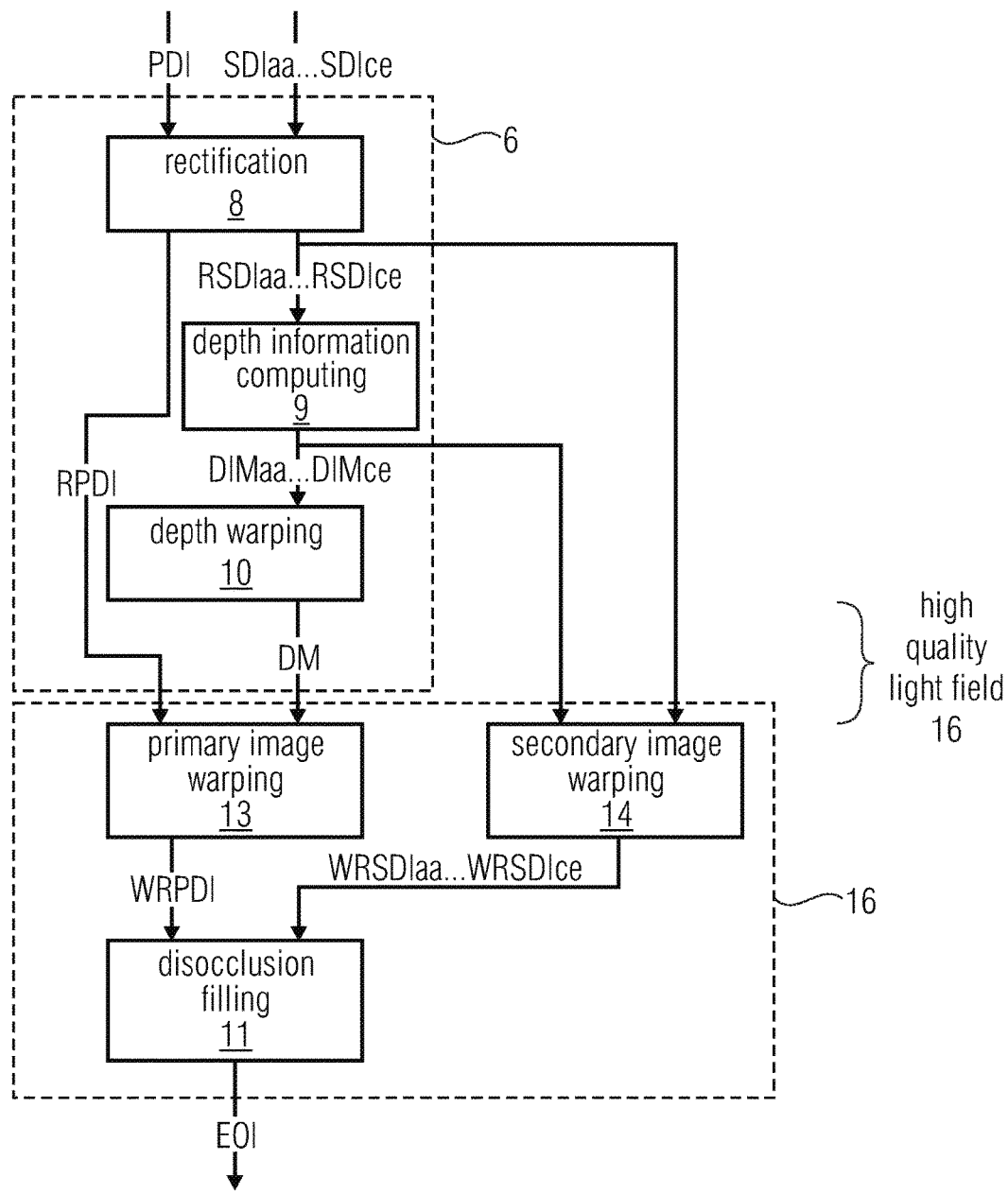
FIG. 4 illustrates a first embodiment of a processing unit and a post-processing unit in a schematic view.

FIG. 4 illustrates a first embodiment of a processing unit 6 and a post-processing unit 16 in a schematic view.

According to an embodiment of the invention the processing unit 6 comprises a rectification module 8 configured for simultaneously rectifying of the secondary digital two-dimensional images SDIaa . . . SDIce of the set of secondary digital two-dimensional images SDIaa . . . SDIce and the primary digital two-dimensional image PDI by using feature points or checkerboards in order to produce a set of rectified secondary digital two-dimensional images RSDIaa . . . RSDIce and a rectified primary digital two-dimensional image RPDI.

According to an embodiment of the invention the processing unit 6 comprises a depth information computing module 9 configured for computing a depth information DIMaa . . . DIMce for each of the secondary cameras 4aa . . . 4ce based on the set of rectified secondary digital two-dimensional images RSDIaa . . . RSDIce.

According to an embodiment of the invention the processing unit 6 comprises a depth warping module 10 configured for warping each of the disparity maps DIMaa . . . DIMce to a position of the rectified primary digital two-dimensional image RPDI in order to produce the depth information DM for the primary digital two-dimensional image PDI or the digital two-dimensional image RPDI corresponding to the primary digital two-dimensional image PDI.

According to an embodiment of the invention the light-field camera 1 comprises a post-processing unit 16 comprising a primary image warping module 13 configured for warping the rectified primary digital two-dimensional image RPDI to a warped rectified primary digital two-dimensional image WRPDI corresponding to a virtual camera position of the primary camera 2 by using the depth information DM.

According to an embodiment of the invention the post-processing unit 16 comprises a secondary image warping module 14 configured for warping each of the rectified secondary digital two-dimensional images RSDIaa . . . RSDIce into warped rectified secondary two-dimensional digital images WRSDIaa . . . WRSDice corresponding to a position of the warped rectified primary two-dimensional image WRPDI.

According to an embodiment of the invention the post-processing unit 16 comprises a disocclusion filling module 11 configured for filling of disocclusions in the warped rectified primary digital two-dimensional image WRPDI with information gathered from the warped rectified secondary digital two-dimensional images WRSDIaa . . . WRSDIce in order to produce an enhanced digital two-dimensional output image EOI.

First of all, the images SDIaa . . . SDIce of the camera array 3 need to be rectified in order to ensure that corresponding pixels are situated in the same row or column. Feature points detected by algorithms like SIFT or SURF enable the derivation of so called homographies [P3, 18]. Applied to the input images SDIaa . . . SDIce, they can be transformed in such a way that corresponding pixels are situated approximately in one row (for horizontally displaced cameras) or one column (for vertically displaced cameras). The determination of the homographies can be continuously performed in case heavy movements risk impacting the mechanical alignment of the cameras 4aa . . . 4ce. Otherwise, homographies can be determined at the beginning of a sequence and then applied to all images SDIaa . . . SDIce that follow in the sequence. In case of this approach, checkerboards may be used for calibration instead of feature points detection.

In case of precise mechanical adjustment of the primary camera 2 and the camera array 3, determination of the homographies can directly include all secondary cameras 4aa . . . 4ce of the camera array 3 and the primary camera 2. In other words, feature detectors collect both the feature points in the secondary cameras 4aa . . . 4ce of the camera array 3 and the primary camera 2. These features are then injected into an algorithm computing the homographies, one for each camera 2, 4aa . . . 4ce. Applying to the input images PDI, SDIaa . . . SDIce leads to a result where corresponding pixels are situated in the same row or column.

Note that in case the resolution of the camera array 3 and the primary camera to do not match, the homographies need to include a corresponding scaling term, that upsamples the secondary cameras 4aa . . . 4ce to the same resolution than the primary camera 2. Furthermore, it has to be noted that feature detectors like SIFT and SURF are robust against illumination changes, such that the different quality of the primary camera 2 and the secondary cameras 4aa . . . 4ce does not pose major difficulties.

In this context it is important to know that homographies applied during the rectification process can rotate the image relatively to the optical pivot point of the camera. To this end, ideally all optical pivot points of all cameras should be situated in a regular 2-dimensional grid. Otherwise, perfect rectification using homographies is not possible.

Figure 5:
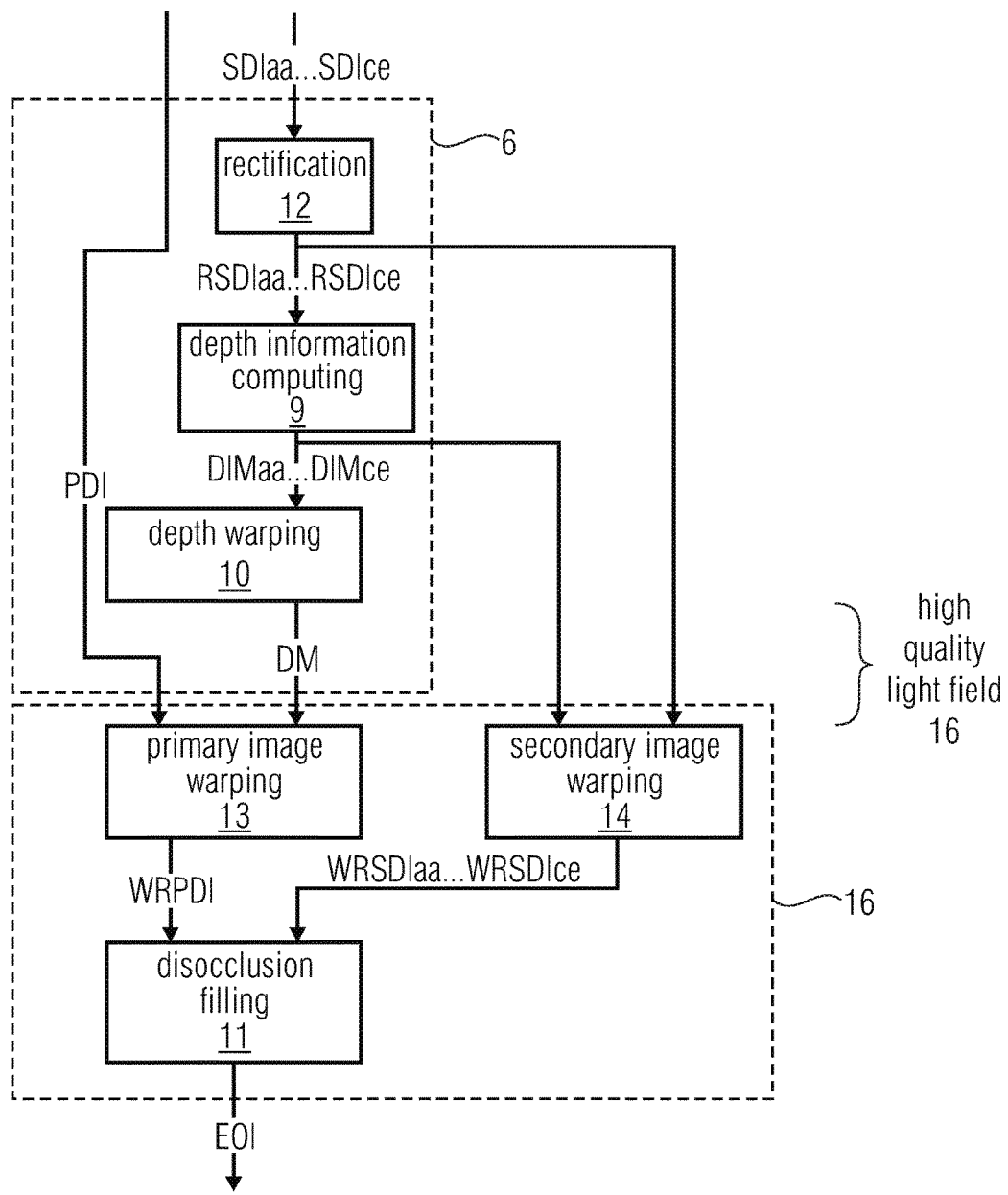
FIG. 5 illustrates a second embodiment of a processing unit and a post-processing unit in a schematic view.

FIG. 5 illustrates a second embodiment of a processing unit 6 and a post-processing unit 16 in a schematic view.

According to an embodiment of the invention the processing unit 6 comprises a rectification module 12 configured for rectifying of the secondary digital two-dimensional images SDIaa . . . SDIce of the set of secondary digital two-dimensional images SDIaa . . . SDIce by using feature points or checkerboards in order to produce a set of rectified secondary digital two-dimensional images RSDIaa . . . RSDIce.

According to an embodiment of the invention the processing unit comprises 6 a depth information computing module 9 configured for computing a depth information DIMaa . . . DIMce for each of the secondary cameras 4aa . . . 4ce based on the set of rectified secondary digital two-dimensional images RSDIaa RSDIce.

According to an embodiment of the invention the processing unit 6 comprises a depth warping module 10 configured for warping each of the depth information DIMaa . . . DIMce to a position of the primary digital two-dimensional image PDI in order to produce the depth information DM for the primary digital two-dimensional image PDI or the digital two-dimensional image RPDI corresponding to the primary digital two-dimensional image PDI.

Unfortunately, in practice it is highly probable that the position of the primary camera 2 deviates from this ideal grid position. Reasons are that the primary camera 2 has different optics and dimensions compared to the secondary cameras 4aa . . . 4ce of the camera array 3. Solving this problem is the purpose of the embodiment of FIG. 5.

In a two-staged rectification, first of all the images SDIaa . . . SDIce of the camera array 3 are rectified independently of the primary camera 2. Moreover, by identification of feature points that can be both seen in the primary camera 2 and the secondary cameras 4aa . . . 4ce of the camera array 3, the position of the picture PDI of the primary camera 2 relative to the rectified pictures RSDIaa . . . RSDIce of the secondary cameras 4aa . . . 4ce of the camera array 3 can be computed.

Next depth information DMIaa . . . DIMce can be computed for every camera 4aa . . . 4ce of the camera array 3, by exploiting that corresponding pixels are situated in the same row or column. Note that the primary camera 2 is not taken into account during this process.

Once the depth information DMIaa . . . DIMce are known, the next tasks consists in warping these depth information DMIaa . . . DIMce to the position and orientation of the primary camera 2, for which so far no depth information is available.

Warping of the depth information DMIaa . . . DIMce may include a shift in x-, y- and z-direction as well as sheering, rotation and scaling operations. Moreover, if the primary camera 2 and the secondary cameras 4aa . . . 4ce show significantly different lens distortions, they need to be taken into account as well or being corrected prior to warping the images.

Figure 6:
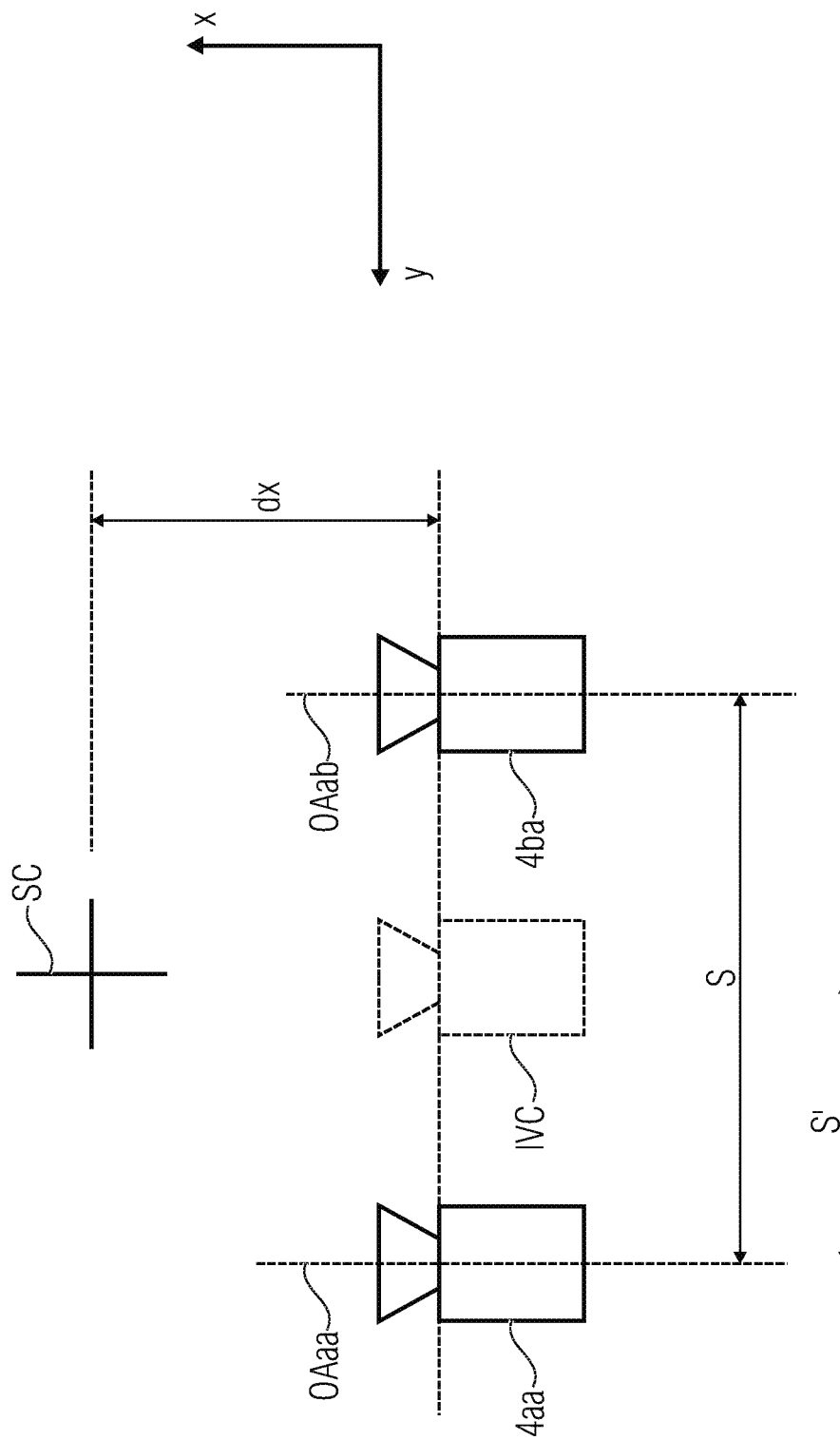
FIG. 6 illustrates a warping of a camera perspective of one of the secondary cameras perpendicular to the optical axis of the secondary camera.

FIG. 6 illustrates a warping of a camera perspective of one of the secondary cameras 4aa . . . 4ce perpendicular to the optical axis OAaa . . . OAce of the secondary camera 4aa . . . 4ce.

FIG. 6 explains the warping of a camera perspective in horizontal or vertical direction. Given are two secondary cameras 4aa and 4ba. Each of the cameras 4aa, 4ba has an associated rectified image RSDIaa, RSDIba and an associated depth information DIMaa, DIMba.

The disparity value d of every pixel depends on the distance dx of the object and the inter camera distance s:

$$d \sim s/dx$$

The disparity values d of all pixels of the rectified image of the secondary camera 4aa form a so called disparity map which contains the depth information DIMaa.

Without loss of generality, the disparity values d may be normalized assuming s=1. Knowing that the disparity d equals the distance between two corresponding pixels, warping along the connecting line between two cameras is straight forward: Every pixel of the rectified image of secondary camera 4aa needs to be shifted by $$d/s \cdot s' = d \cdot s'$$

in order to obtain a view that would have been observed by interim virtual camera IVC.

Similarly, the disparity map, which contains the depth information DIMab, of camera 4ab can be warped such that it corresponds to the view that would have been obtained for interim virtual camera IVC.

Similarly, the disparity map, which contains the depth information DIMba, of camera 4ba can be warped such that it corresponds to the view that would have been obtained for interim virtual camera IVC.

At this point it is important to note that not all parts of the scene CN visible by the interim virtual camera IVC are also visible by secondary camera 4aa due to so called occlusions. Consequently, when warping the image or disparity map of camera 4aa to the position of interim virtual camera IVC, there might be regions where no information is available.

However, in case the object is visible in secondary camera 4ba, combination of the warped images from camera 4aa and 4ba can solve this problem. The more cameras can be combined, the smaller is the probably of remaining holes in the resulting image.

Figure 7:
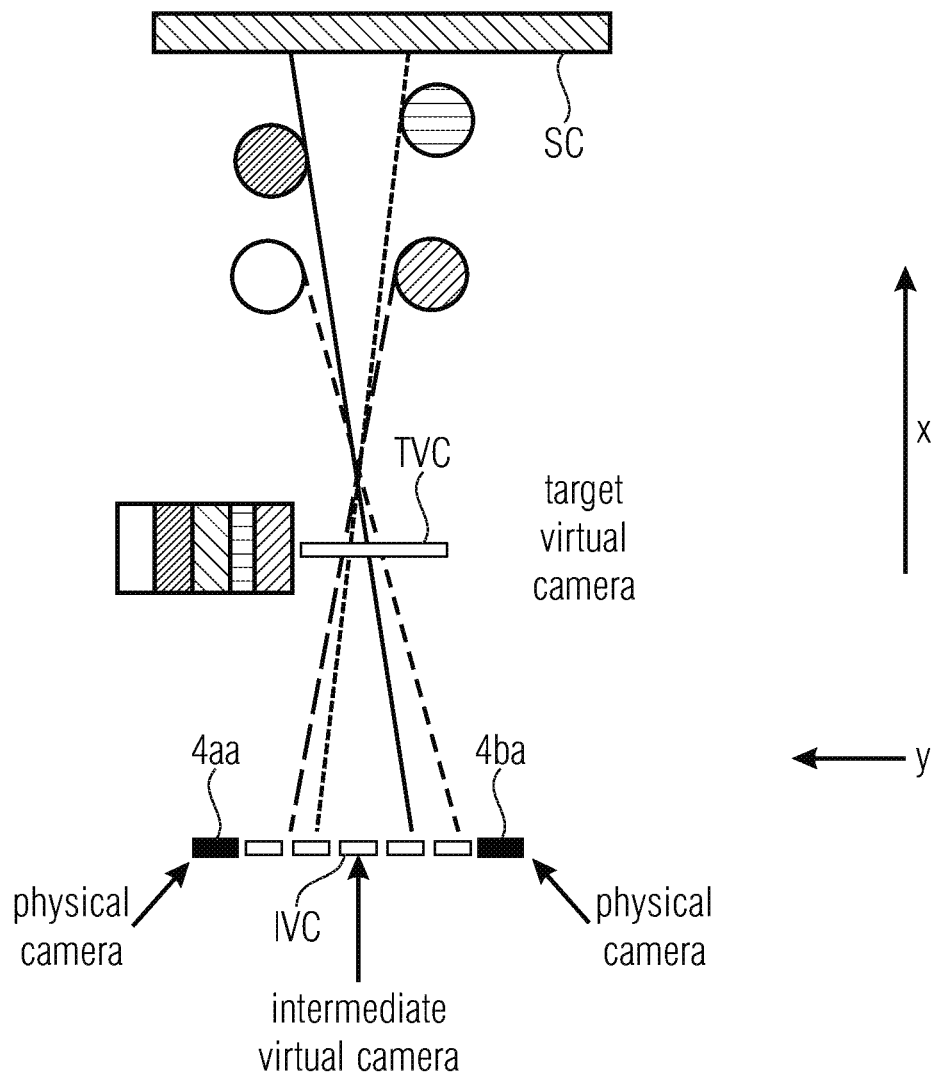
FIG. 7 illustrates a warping of a camera perspective of one of the secondary cameras along the optical axis of the secondary camera.

FIG. 7 illustrates a warping of a camera perspective of one of the secondary cameras 4aa . . . 4ce along the optical axis OAaa . . . OAce of the secondary camera 4aa . . . 4ce.

FIG. 7 illustrates the warping in x-direction parallel to the optical axes OA of a camera. It shows two physical cameras 4aa, 4ba that shall be warped to a target virtual camera TVC with different z-position. Following a simple ray model, for every pixel of the target virtual camera TVC a pixel and the intermediate virtual camera can be identified that it is hidden by the same ray. The intermediate virtual camera IVC lies in the plane of the physical cameras 4aa, 4ba. Its image can hence be generated by corresponding warping as explained above. Please note that despite FIG. 7 sketches a linear array of physical cameras, a complete two-dimensional grid of physical cameras is necessitated when warping two-dimensional images in order to cope with occurring disocclusions.

By these means, it is hence possible to generate a disparity map of a target virtual camera TVC, whose optical pivot point matches the one of the primary camera 2. Applying homographies to the RGB image of primary camera 2 and scaling the disparity map makes them matching pixel by pixel. It has to be noted that super-resolution algorithms can be applied in order to compensate for resolution loss due to warping and scaling.

Consequently, even if mechanically not perfectly aligned, correct depth information can be computed for the primary camera 2 based on the data of the camera array 3.

Figure 8:
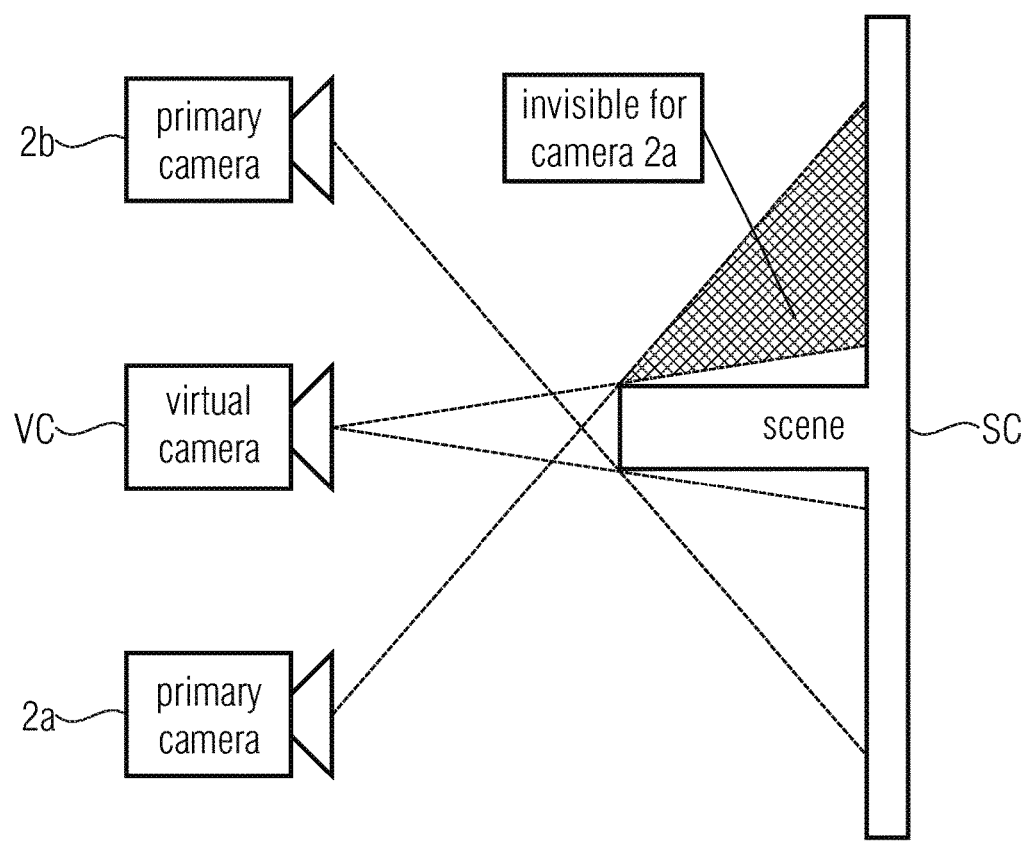
FIG. 8 illustrates an occlusion caused by the camera perspective of the primary camera.

FIG. 8 illustrates an occlusion caused by the camera perspective of the primary camera 2a.

Once the depth information DM for the primary camera 2a is available, a large number of image processing manipulations are possible. As an example the synthesis of a vertical primary-camera image is explained in the following.

As explained above, the existence of a disparity map for an image allows warping it to different x-, y-, and z-positions. This is hence also possible for the primary camera image. However, such a warping might lead to disocclusions in case the chosen virtual camera position should "see" objects or object details that are not visible by the primary camera 2a.

FIG. 8 illustrates the corresponding problem. Suppose that only camera 2a would be available for generating the depicted virtual camera image, the whole shaded area could not be properly reconstructed in the virtual camera. On the other hand, existence of camera 2b can easily provide this information.

Consequently, as a rule of thumb virtual cameras should only move between existing physical cameras. Moreover, the disparity difference between the foreground and the background objects should not be too large. Transferred to the problem of the virtual primary-camera VC, more than one primary camera 2a, 2b would be necessitated to achieve sufficient image quality. This, however, is prohibitive due to cost reasons.

Consequently, in this invention we propose to fill the occurring disocclusions with the images of the camera array 3. Although they show inferior image quality compared to the primary camera 2, this does not cause major difficulties, because disocclusions are typically of rather small extensions. Moreover, one can warp all images of the camera array 3 to the same position than from the primary camera 2. By comparing pixels that are available for both the primary camera 2 and the secondary cameras of the camera array 3, one can identify quality deficiencies in the standard cameras and compensate them either globally or locally.

Strategies for compensation include among others a histogram matching [1] of the primary camera 2 and of the camera array 3.

Figure 9:
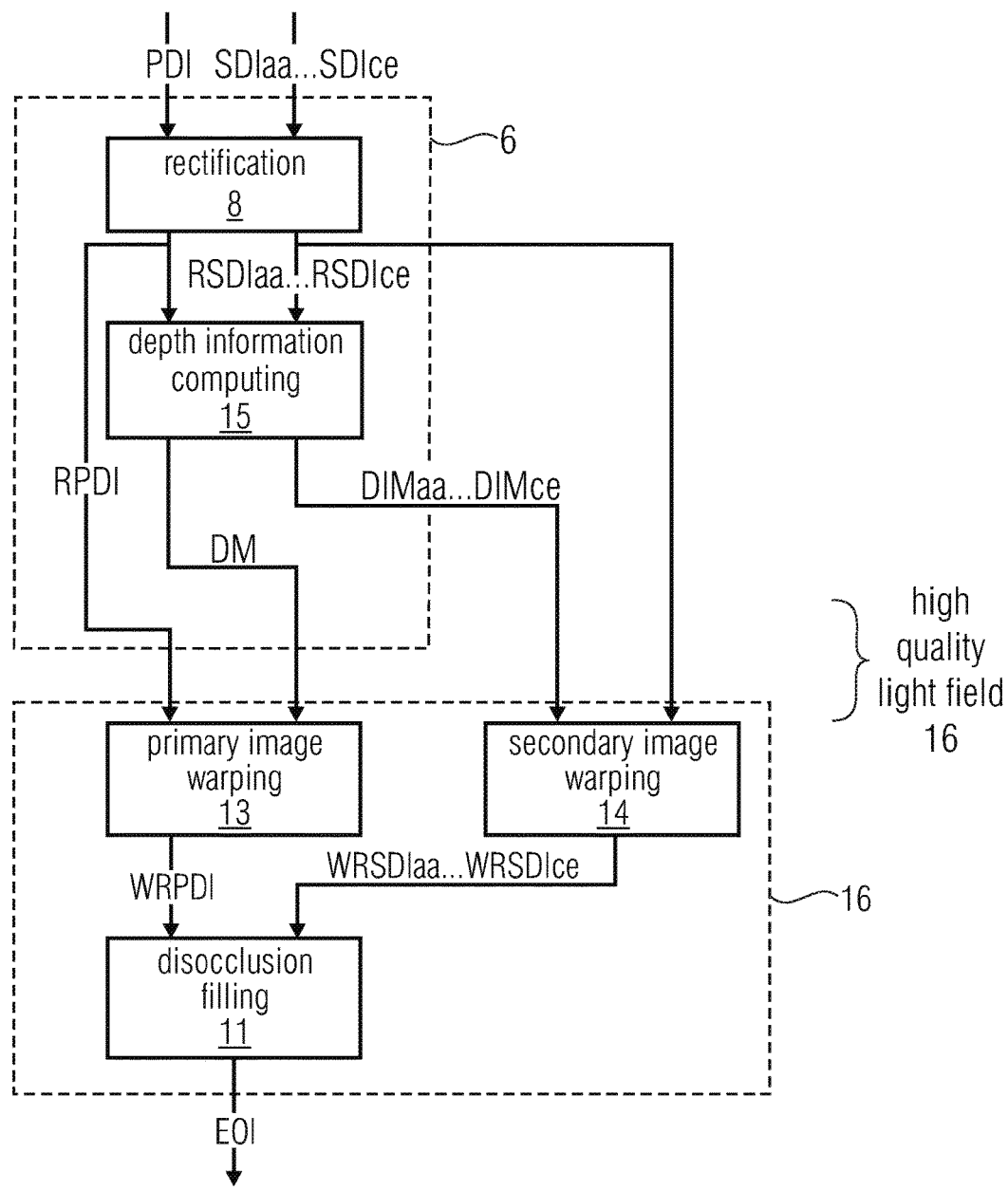
FIG. 9 illustrates a third embodiment of a processing unit and a post-processing unit in a schematic view.

FIG. 9 illustrates a third embodiment of a processing unit 6 and a post-processing unit 16 in a schematic view.

As in the embodiment of FIG. 4 the processing unit 6 comprises a rectification module 8 configured for simultaneously rectifying of the secondary digital two-dimensional images SDIaa . . . SDIce of the set of secondary digital two-dimensional images SDIaa . . . SDIce and the primary digital two-dimensional image PDI by using feature points or checkerboards in order to produce a set of rectified secondary digital two-dimensional images RSDIaa . . . RSDIce and a rectified primary digital two-dimensional image RPDI.

According to an embodiment of the invention the processing unit 6 comprises a depth information computing module 15 configured for computing a depth information DIMaa . . . DIMce for each of the secondary cameras 4aa . . . 4ce and a depth information DM for the primary camera 2 based on the set of rectified secondary digital two-dimensional images RSDIaa . . . RSDIce and the rectified primary image RPDI.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may be configured, for example, to be transferred via a data communication connection, for example via the Internet.

A further embodiment comprises a processing means, for example a computer, or a programmable logic device, configured or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

Patent Documents

[P1] US 2014/0098199 A1
[P2] US 2013/0021448 A1
[P3] U.S. Pat. No. 6,711,293 B1
[P4] US 2014/0049536 A1
[P5] U.S. Pat. No. 7,948,515 B1

Other Documents

[1] Shapira D., Avidan S., Hel-Or Y. (2013): "MULTIPLE HISTOGRAM MATCHING", In Proceedings of The IEEE International Conference on Image Processing
[2] Fraunhofer H H I, "First Trifocal 3D film at NAB Show", http://www.hhi.fraunhofer.de/fields-of-competence/imageprocessing/news/news-article/article/first-trifocal-3d-film-at-nabshow.html
[3] Frederik Zilly, "Multi Camera Content Creation—New Technologies for Next Generation 3D", Fraunhofer H H I, http://www.hhi.fraunhofer.de/fieldsof-competence/image-processing/solutions/capture/multi-cameracontent-creation.html, accessed 27 Jan. 2015
[4] Levoy, M., Hanrahan, P. (1996). "Light Field Rendering", Proc. ACM SIGGRAPH, ACM Press, pp. 31-42.
[5] Gortler, S. J., Grzeszczuk, R., Szeliski, R., Cohen, M. (1996). "The Lumigraph", Proc. ACM SIGGRAPH, ACM Press, pp. 43-54.
[6] Zilly, Frederik; Schöberl, Michael; Schäfer, Peter; Ziegler, Matthias; Keinert, Joachim; Foessel, Siegfried (2013). "Lightfield Media Production System using Sparse Angular Sampling", Proceedings, SIGGRAPH '13 ACM SIGGRAPH 2013 Posters
[7] Zilly, Frederik; Ziegler, Matthias; Keinert, Joachim; Schöberl, Michael; Foessel, Siegfried (2014). "Computational Imaging for Stop-Motion animated Video Productions", Proceedings, IBC2014 Conference
[8] Georgiev, T.; Yu, Z.; Lumsdaine, A. & Goma, S. (2013). "Lytro camera technology: theory, algorithms, performance analysis", In Proc. SPIE 8667, Multimedia Content and Mobile Devices

[9] Lytro, "Lytro Ilium Camera"
[10] Bishop, T. E. & Favaro, P. (2012). "The light field camera: Extended depth of field, aliasing, and superresolution", IEEE PAMI
[11] Wilburn, B.; Joshi, N.; Vaish, V.; Talvala, E.; Antunez, E.; Barth, A.; Adamas, A.; Horowitz, M. & Levoy, (2005). "M. High performance imaging using large camera arrays", ACM Trans. Graph. (Proc. SIGGRAPH), 24, 765-776
[12] Marton, F.; Gobbetti, E.; Bettio, F.; Guitian, J. & Pintus, R. (2011). "A real-time coarse-to-fine multiview capture system for all-in-focus rendering on a light-field display", 3DTV-CON, 1-4
[13] Balogh, T. & Kovács, P. T. (2010). "Real-time 3D light field transmission", Proc. SPIE, 772406:1-7
[14] Fehn, C. A (2003). "3D-TV approach using depth-image-based rendering (DIBR)", VIIP
[15] Zilly, F. (2012). "Multi-Camera Rectification using Linearized Trifocal Tensor Proc.", ICPR
[16] Keinert, J.; Wetzel, M.; Schöberl, M.; Schäfer, P.; Zilly, F.; Bätz, M.; Föβel, S.; Kaup, A. (2014). "Cost-effective multi-camera array for high quality video with very high dynamic range", Proc. SPIE 9023, Digital Photography X, 90230Y
[17] Seitz, S.; Curless, B.; Diebel, J.; Scharstein, D. & Szeliski, R. (2006). "A Comparison and Evaluation of Multi-View Stereo Reconstruction Algorithms", Proc. CVPR, 1, 519-528
[18] Herbert Bay, Tinne Tuytelaars and Luc Van Gool (2006). "SURF: Speeded Up Robust Features", Proceedings of the 9th European Conference on Computer Vision, Springer Verlag
[19] http://www.stereo-3d-info.de/stereo-rigs-und-professionelle-3drigs.html, accessed 27 Jan. 2015
[20] Tauber, Z., Li, Z. N., & Drew, M. S. (2007). "Review and preview: Disocclusion by inpainting for image-based rendering". IEEE TRANSACTIONS ON SYSTEMS MAN AND CYBERNETICS PART C APPLICATIONS AND REVIEWS, 37(4), 527.
[21] Zilly, F.; Riechert, C.; Muller, M.; Kauff, P. (2012). "Generation of multiview video plus depth content using mixed narrow and wide baseline setup," 3DTV-Conference: The True Vision—Capture, Transmission and Display of 3D Video (3DTV-CON), doi: 10.1109/3DTV.2012.6365483
[22] Jeroen Van Baar (Disney Research Zurich). "Multi-Sensor FusionCam", http://www.disneyresearch.com/project/multi-sensor-fusioncam/, accessed 27 Jan. 2015

The invention claimed is:

1. A light-field camera for capturing multiple views of a scene, the multiple views representing samples of a light-field, the light-field camera comprising:
a primary camera configured for capturing a primary digital two-dimensional image of the scene;
a two-dimensional camera array comprising a plurality of secondary cameras, wherein each of the secondary cameras is configured for capturing a secondary digital two-dimensional image of the scene in order to produce at least one set of secondary digital two-dimensional images of the scene;
a semitransparent mirror arranged in such way that an incident light beam originating from the scene is split up in a first partial light beam, which is directed to the primary camera, and a second partial light beam, which is directed to the camera array; and
a circuitry or processor configured for:
receiving the primary digital two-dimensional image and the at least one set of secondary digital two-dimensional images and configured for computing depth information for the primary digital two-dimensional image or a digital two-dimensional image corresponding to the primary digital two-dimensional image based on the set of secondary digital two-dimensional images;
simultaneously rectifying of the secondary digital two-dimensional images of the set of secondary digital two-dimensional images and the primary digital two-dimensional image by using feature points or checkerboards in order to produce a set of rectified secondary digital two-dimensional images and a rectified primary digital two-dimensional image; and
warping the rectified primary digital two-dimensional image to a warped rectified primary digital two-dimensional image corresponding to a virtual camera position of the primary camera by using the depth information.

2. The light-field camera according to claim 1, wherein the primary camera fulfills at least one of the following conditions: comprising a higher resolution than the secondary cameras, comprising a better quality of color reproduction than the secondary cameras, comprising a wider dynamic range than the secondary cameras, comprising a larger signal-to-noise ratio than the secondary cameras, comprising higher bit depth than the secondary cameras.

3. The light-field camera according to claim 1, wherein a primary objective of the primary camera comprises fewer distortions than secondary objectives of the secondary cameras.

4. The light-field camera according to claim 1, wherein the circuitry or processor is configured for computing the depth information for the digital two-dimensional output image corresponding to the primary digital two-dimensional image solely based on the set of secondary digital two-dimensional images and on the position of the primary camera relative to the secondary cameras.

5. The light-field camera according to claim 1, wherein the secondary cameras comprise substantially parallel optical axes.

6. The light-field camera according to claim 1, wherein the secondary cameras comprise the same optical and/or electrical properties.

7. The light-field camera according to claim 1, wherein the secondary cameras are arranged in a lattice-like manner.

8. The light-field camera according to claim 1, wherein the primary camera, the camera array and the semitransparent mirror are mounted to a rig.

9. The light-field camera according to claim 8, wherein the rig comprises a mechanical adjuster for adjusting a crossing point of an optical axis of the primary camera and the optical axis of one of the secondary cameras.

10. The light-field camera according to claim 8, wherein the rig comprises a mechanical adjuster for compensating a difference of an optical path length from the scene to the primary camera and an optical path length from the scene to the camera array.

11. The light-field camera according to claim 8, wherein the rig comprises a mechanical adjuster for adjusting an angular orientation of the primary camera with respect to a rotation about a first rotation axis parallel to an optical axis of the primary camera relative to an angular orientation of the camera array with respect to a rotation about an rotation axis parallel to the optical axes of the secondary cameras.

12. The light-field camera according to claim 8, wherein the rig comprises a mechanical adjuster for compensating a difference of an angle from the optical axis of the primary camera to the first partial light beam and an angle from the second partial light beam to the optical axes of one of the secondary cameras.

13. The light-field camera according to claim 1, wherein the secondary cameras are configured for capturing a plurality of sets of secondary digital two-dimensional images while the primary camera captures one primary digital two-dimensional image, wherein each set of secondary digital two-dimensional images comprises different exposure settings than the other sets of secondary digital two-dimensional images, and wherein the circuitry or processor is configured for computing the depth information based on the plurality of sets of secondary digital two-dimensional images.

14. The light-field camera according to claim 1, wherein the secondary cameras are combined into groups, wherein each group is configured to produce a subset of the set of secondary digital two-dimensional images of the scene, wherein each secondary camera comprises the same exposure settings as the other secondary cameras of the same group but different exposure settings than the secondary cameras of the other groups.

15. The light-field camera according to claim 1, wherein the circuitry or processor is configured for computing a depth information for each of the secondary cameras based on the set of rectified secondary digital two-dimensional images.

16. The light-field camera according to claim 1, wherein the circuitry or processor is configured for warping each of the depth information to a position of the rectified primary digital two-dimensional image in order to produce the depth information for the primary digital two-dimensional image or the digital two-dimensional image corresponding to the primary digital two-dimensional image.

17. The light-field camera according to claim 16, wherein the circuitry or processor is configured for computing a depth information for each of the secondary cameras based on the set of rectified secondary digital two-dimensional images.

18. The light-field camera according to claim 1, wherein the circuitry or processor is configured for warping each of the disparity maps to a position of the primary digital two-dimensional image in order to produce the depth information for the primary digital two-dimensional image or the digital two-dimensional image corresponding to the primary digital two-dimensional image.

19. The light-field camera according to claim 1, wherein the circuitry or processor is configured for computing a depth information for each of the secondary cameras and the depth information for the primary camera based on the set of rectified secondary digital two-dimensional images and the rectified primary image.

20. The light-field camera according to claim 1, wherein the circuitry or processor is configured for warping each of the rectified secondary digital two-dimensional images into warped rectified secondary two-dimensional digital images corresponding to a position of the warped rectified primary two-dimensional image.

21. The light-field camera according to claim 1, wherein the circuitry or processor is configured for filling of disocclusions in the warped rectified primary digital two-dimensional image with information gathered from the warped rectified secondary digital two-dimensional images in order to produce an enhanced digital two-dimensional output image.

22. A method for capturing multiple views of a scene, the multiple views representing samples of a light-field, the method comprising:

capturing a primary digital two-dimensional image of the scene using a primary camera;

producing at least one set of secondary digital two-dimensional images of the scene using a two-dimensional camera array comprising a plurality of secondary cameras, wherein each of the secondary cameras is configured for capturing a secondary digital two-dimensional image of the scene;

providing a semitransparent mirror arranged in such way that an incident light beam originating from the scene is split up in a first partial light beam, which is directed to the primary camera, and a second partial light beam, which is directed to the camera array; and receiving the primary digital two-dimensional image and the at least one set of secondary digital two-dimensional images and computing depth information for the primary digital two-dimensional image or a digital two-dimensional image corresponding to the primary digital two-dimensional image based on the set of secondary digital two-dimensional images using a processing unit;

using a rectification module of the processing unit for simultaneously rectifying of the secondary digital two-dimensional images of the set of secondary digital two-dimensional images and the primary digital two-dimensional image by using feature points or checkerboards in order to produce a set of rectified secondary digital two-dimensional images and a rectified primary digital two-dimensional image; and using a primary image warping module of a post-processing unit of the light-field camera for warping the rectified primary digital two-dimensional image to a warped rectified primary digital two-dimensional image corresponding to a virtual camera position of the primary camera by using the depth information.

23. A non-transitory digital storage medium having stored thereon a computer program for performing the method of claim 22 when said computer program is run by a computer.

* * * * *